Figure 1:
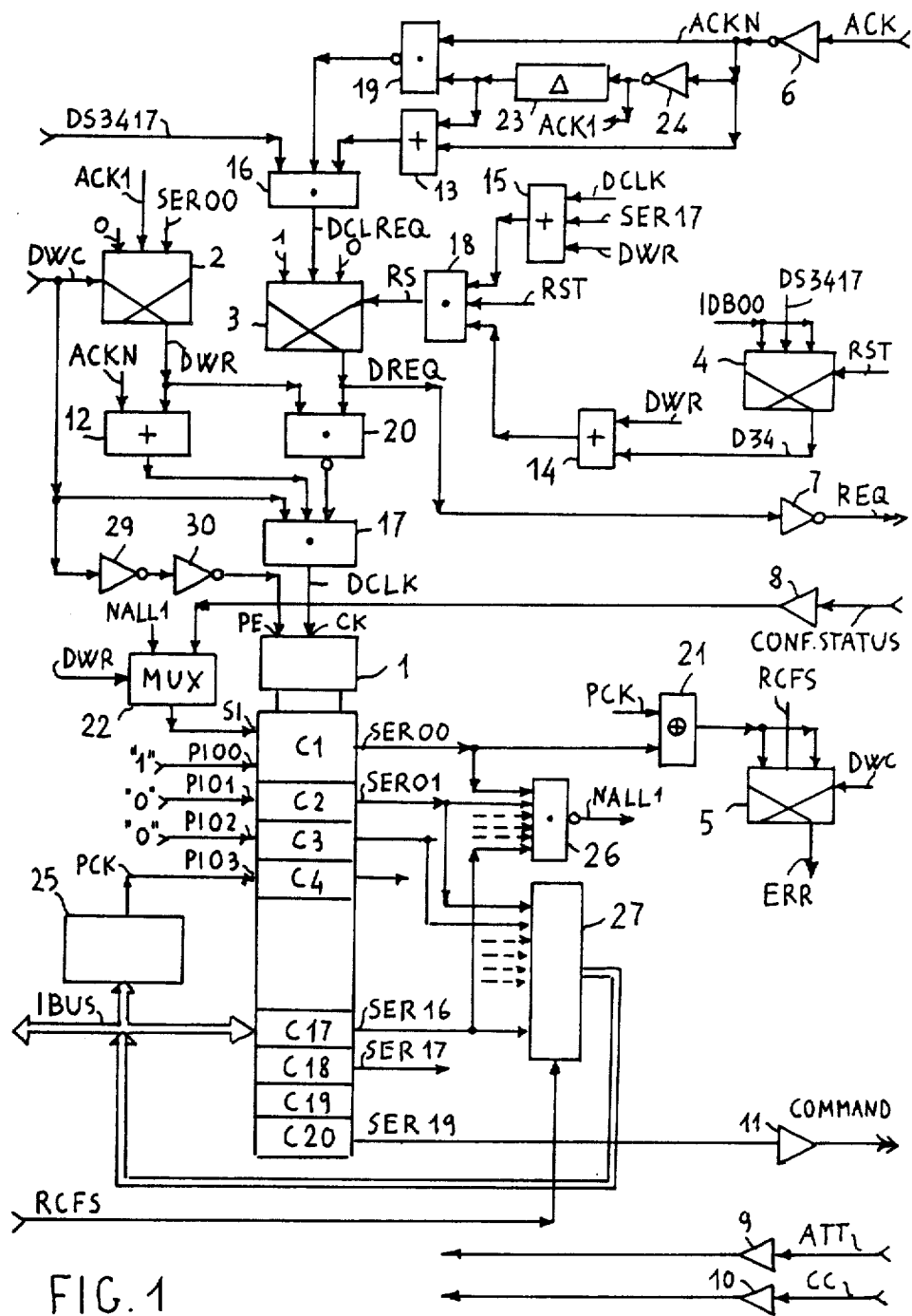

United States Patent [19]

Boioli et al.

[11] Patent Number: 4,910,705

[45] Date of Patent: Mar. 20, 1990

[54] ESDI INTERFACE CONTROL CIRCUIT

[75] Inventors: Roberto Boioli, Busto Garolfo; Pierluigi Tagliabue, Milan, both of Italy

[73] Assignee: Bull HN Information Systems Italia S.p.A., Caluso, Italy

[21] Appl. No.: 230,560

[22] Filed: Aug. 10, 1988

[30] Foreign Application Priority Data

Sep. 16, 1987 [IT] Italy ................. 21918 A/87

[51] Int. Cl.⁴ ............................................. G06F 7/00
[52] U.S. Cl. ........................ 364/900; 364/927.99; 364/939.5; 364/709.09; 377/54
[58] Field of Search ............. 377/73, 70, 2, 54; 364/709.09

[56] References Cited

U.S. PATENT DOCUMENTS 3,822,406  7/1974  Evans et al. ................. 377/73
4,419,762 12/1983  Paul ............................ 377/73
4,710,869 12/1987  Enokizono ................. 364/709.09

*Primary Examiner*—John S. Heyman
*Attorney, Agent, or Firm*—John S. Solakian; Gerald J. Cechony

[57] ABSTRACT

An interface control circuit includes a shift register which is parallel loaded with a 17 bit binary code and with control information comprising two bits of opposite level loaded in the head cells of the register, the first bit having a control function, the second having a separation function from the 17 bit binary code. The parallel loading is performed by a load command which also sets a control flip flop and wherein a timing circuit, triggered by command, controls in continuous mode the interlocked interface dialogue as long as the control flip flop is set, and causes the register to shift its contents so as to serially unload the binary code to the interface and to serially load the register with the logic level of the control bit, until, at the completion of transferring the control bit level present at a predetermined number of register outputs is inverted, reintroduced in the first register cell and causes the control flip flop to reset and the dialogue to halt.

If the binary code transmission has to be followed by the reception of a binary code, the timing unit is held active and the binary code is serially loaded in the register until the control bit, with inverted logic level, appears at a predetermined output of the register and stops the dialogue, the binary code serially loaded in the register being then available for parallel read out.

3 Claims, 3 Drawing Sheets

FIG.4

ESDI INTERFACE CONTROL CIRCUIT

BACKGROUND OF THE INVENTION

The present invention relates to an ESDI interface control circuit.

Recently an interface has been adopted for use in data processing systems, which interface is named ESDI, acronym for Enhanced Small Device Interface.

This interface is of a serial type, makes use of a small number of leads of the transfer of binary information and is well suited for connecting controllers to disk units.

The ESDI interface comprises six leads.

A first lead COMMAND is used to transfer in serial mode from the controller to a peripheral unit a command consisting of 16 bits plus an odd parity check bit.

A second lead, CONF. STATUS is used to transfer in serial mode from a peripheral unit to the controller information relating to the status and the features of the peripheral unit. This information consists of 16 bits plus an odd parity check bit.

The information exchange occurs through an interlocked dialogue conducted over two control leads, TRANSFER REQUEST and ACKNOWLEDGE.

The controller always leads the dialogue by sending a command in case peripheral status information is to be received.

The interface-protocol logic is inverted relative to the electrical level of the signals: in other words a signal is asserted or true when at electrical level 0 volts and deasserted or false when at positive elctrical level.

In order to control the interface dialogue, the controller puts a first bit of information on lead COMMAND and asserts a signal REQ on lead TRANSFER REQUEST (hereinafter TR).

On receipt of REQ the peripheral unit answers by asserting a signal ACK on lead ACKNOWLEDGE.

On receipt of ACK the controller deasserts (negates) signal REQ and the information bit present on lead COMMAND is replaced with a new information bit.

On receipt of signal REQ at logical level 0, the peripheral unit resets signal ACK to logical level 0.

On receipt of signal ACK at level 1, the controller asserts again signal REQ, and so on until the full transfer of the 17 bits of information has occurred.

If the command information which has been sent requires the receiving of status information, once the 17 bits have been forwarded to the peripheral unit, the controller asserts again signal REQ.

In response to such request, the peripheral unit puts a first information bit on lead CONF. STATUS, then asserts signal ACK.

On receipt of signal ACK asserted, the controller loads the information bit in a register and removes or negates signal REQ.

On receipt of signal REQ false the peripheral unit negates signal ACK.

On receipt of signal ACK at level 1, the controller asserts again signal REQ to request a second status information bit and so on, untill the 17th bit is received, in which case the controller does not assert signal REQ any more in order to terminate the transfer operation.

The other two interface leads, named CC (Command complete) and ATT (Attention) are used by the peripheral unit; the first (CC) to notify the controller that the peripheral unit is ready to receive a command, because the previous one has been executed, and particularly, if the command was a request to receive status information, to notify that the transfer has occurred; the second (ATT) to notify the controller that within the peripheral unit a status change has occurred and the controller is invited to perform a status read dialogue (preceded by the related command).

On lead CC, signal COMM is asserted if at electrical level 0 and rises to a positive electrical level when a command information begins to be received. It drops to zero once the received command has been executed.

On lead ATT, the signal is normally at positive electrical level and drops to 0 when the signal is asserted.

The preceding description of the ESDI interface communication protocol is useful to understand the scope and the advantages of the invention: A control circuit for ESDI interface must comprise means for sending and receiving information in serial form, timing means for timing the transfer operation and counting means for counting the number of bits sent and received.

Although the applicant does not know of any document describing such a control circuit for an ESDI interface, it is conceptually possible to devise, as an obvious design choice, a control circuit comprising a shift register for serialization of a data output from controller, a shift register for serially receiving and parallel reading of serial data input, a counter for counting the bits transmitted and received and timing circuits for timing the dialogue.

An embodiment of this kind would be complex and expensive.

The ESDI interface control circuit overcomes these disadvantages, which is the object of the present invention. The resulting control circuit is very simple and inexpensive.

According to the invention a single shift register is used to serialize a parallel command information to be transmitted, bit by bit, and to obtain in parallel form status information which is received in serial form.

Moreover the same shift register is loaded with control information at a predetermined electrical level so that the status of the shift register defines the number of transmitted or received bits and enables stopping of the transfer process without need of counters.

The shift register is activated by two firmware commands, which preset the status of two control flip flops, as a function of the operations to be performed and provide control signals to a timing logic. The timing logic is triggered by one of the firmware commands, to generate signal REQ and a clock signal for the shift register, is maintained in active state by signals ACK received from the peripheral unit and is stopped by the control information loaded in the shift register. This control information further resets one of the two control flip flops.

These and other features of the invention will appear more clearly from the following description of a preferred form of embodiment and from the enclosed drawings where:

FIG. 1: shows a control circuit preferred form of embodiment in accordance with the invention.

Figure 2:
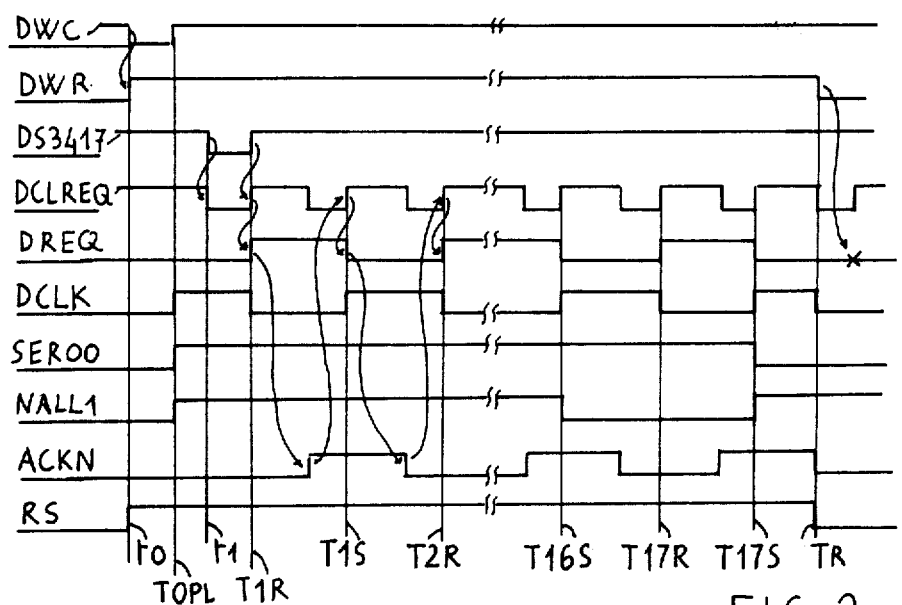

FIG. 2: shows in timing diagram the operation of the circuit of FIG. 1 when transmitting a command.

Figure 3:
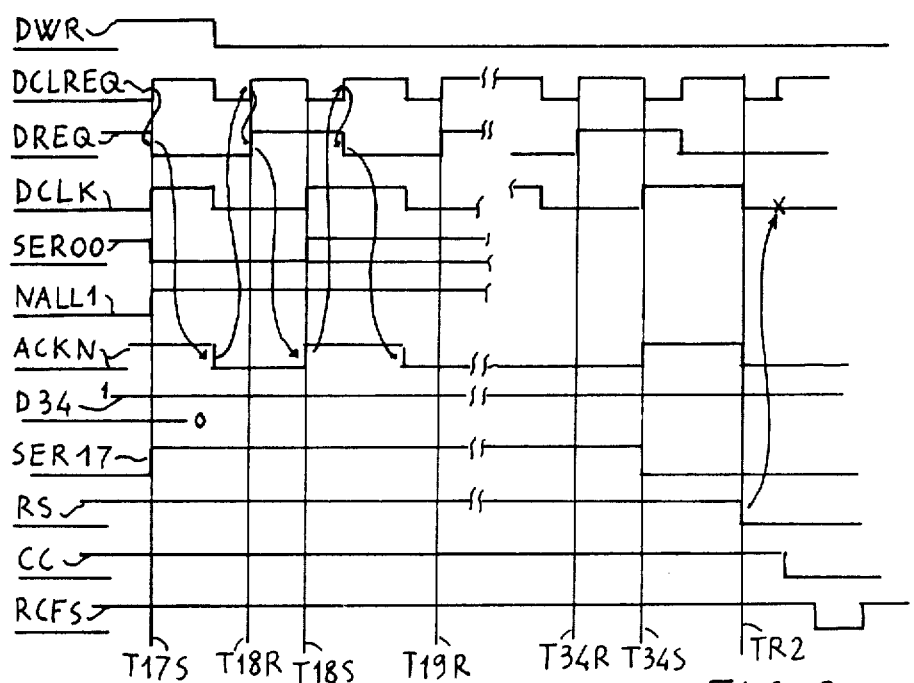

FIG. 3: shows in timing diagram the operation of the circuit of FIG. 1 when receiving status information.

Figure 4:
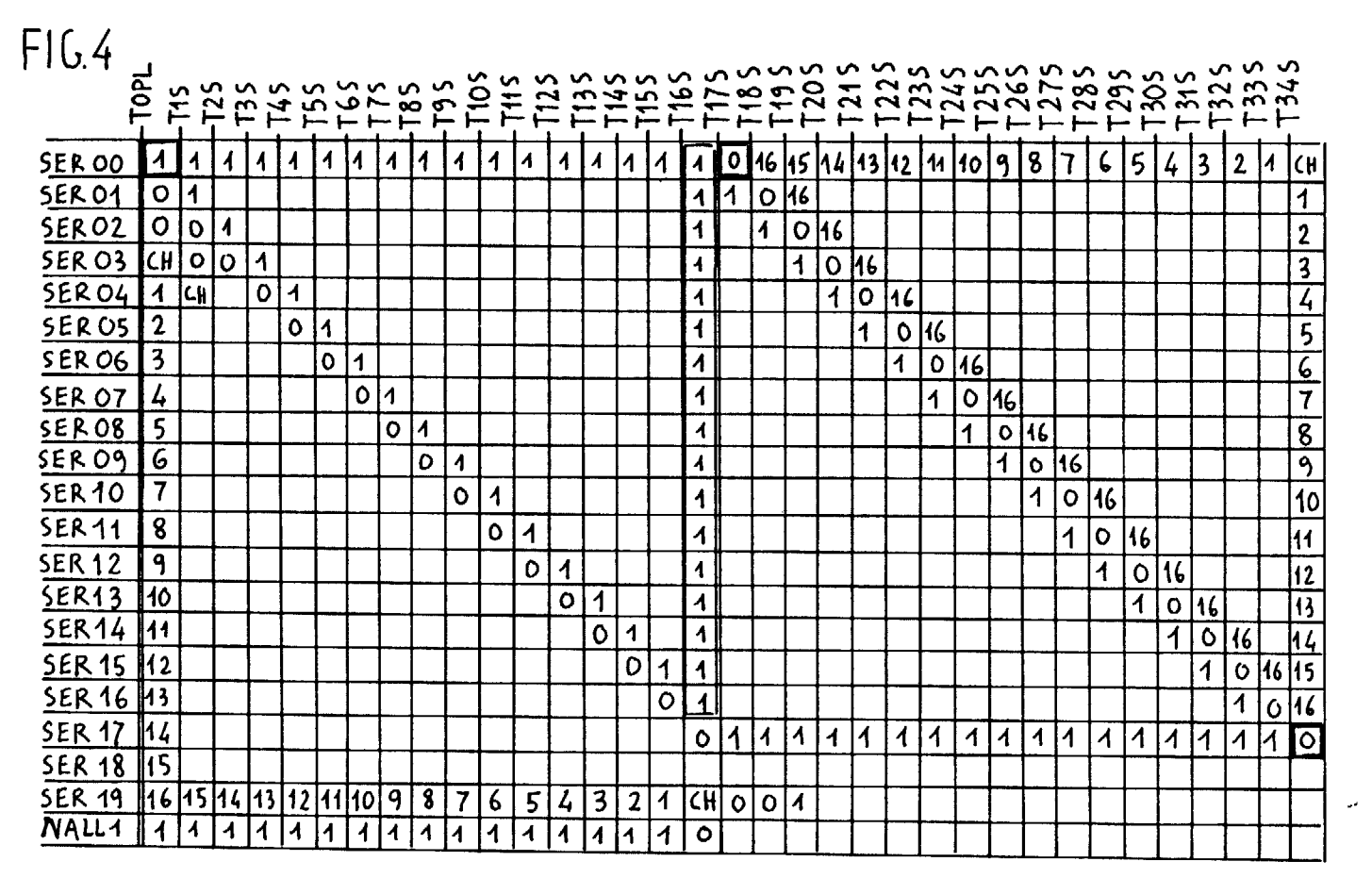

FIG. 4: shows in tabular form the status of shift register of FIG. 1.

Referring to FIG. 1, the control circuit comprises a shift register 1; four JK flip flops 2,3,4,5; an inverting receiver 6; an inverting driver 7; three two-input OR gates 12,13,14; a three input OR gate 15; three AND gates with three inputs 16,17,18; two NAND gates 19,20 having two inputs; an exclusive OR 21; a two way multiplexer 22; a delay element 23; three inverters 24,29,30; a parity generator 25; an NAND gate 26 having 17 inputs; and a set of 16 drivers 27.

The ESDI interface control circuit is part of a peripheral unit controller and is coupled to other parts of the controller through the interconnections shown on the left side of FIG. 1.

Such interconnections consist of a bidirectional bus IBUS having 16 leads, and in three control leads, designated by the names of corresponding microcommands issued by the controller, namely DWC, DS3417, RCFS.

The interface connections are shown on the right side of FIG. 1: they are lead "ACKNOWLEDGE" to receive signal ACK, lead "TRANSFER REQUEST" to send signal REQ to the peripheral unit, lead "CONF. STATUS" to receive from a peripheral unit the serial status information, lead COMMAND to send the serial command information to the peripheral unit, and leads ATT and CC to receive the "attention" signal and "Command Complete" signal, issued by the peripheral unit.

These last two signals are transferred, through receivers 9,10 to controller elements not shown, because they are outside the scope of the invention and are not required for understanding it.

The timing logic essentially comprises flip flop 3, gates 16,13,19, inverter 24, inverting receiver 6 and delay element 23.

It provides for generating signal REQ and to interlock signal REQ and received signal ACK.

Flip flop 3 is normally reset and has the JK inputs connected respectively to an electrical level 1 and 0, so as to toggle when a positive transition (from 0 to 1) is received at the clock input.

The clock input is connected to the output of AND gate 16 from which signal DCLREQ is received.

AND gate 16 receives signal DS3417 at a first input.

DS3417 is normally at electrical level 1 and is asserted when dropped to level 0.

A second input of AND gate 16 is connected to the output of NAND 19 and a third input is connected to the output of OR 13.

Gates 19 and 13 receive signal ACKN at one input. ACKN, output from inverting receiver 6, is the inverse of signal ACK.

ACKN is further input to inverter 24 which outputs signal ACK1.

ACK1 is input to delay element 23, having for instance a fixed delay of 100 nsec.

The output of delay element 23 is connected to the second input of gates 19 and 13.

It can be easily seen that if DS3417=1 (deasserted) signal DCLREQ in output from gate 16 is at electrical level 1 independently on the level of ACK.

However at each transition of signal ACK (from 1 to 0 or from 0 to 1) signal DCLREQ is dropped to 0 for a duration of 100 nsec (or slighty more, if the propagation delay of inverter 24 is taken into account).

The direct output of flip flop 3 is connected to the input of inverting driver 7.

It is therefore clear that a signal DREQ, normally at electrical level 0 is present at the direct output of flip flop 3 (which is normally reset).

With the assertion of signal DS3417 and its subsequent negation a clock transition is applied to flip flop 3 which toggles and is set.

Signal DREQ raises to 1 and signal REQ is asserted.

On receipt of signal REQ asserted, the peripheral unit answers by asserting ACK.

Therefore DCLREQ is dropped to 0 for a duration of 100 nsec, following which flip flop 3 toggles again dropping DREQ to 0 and raising REQ to 1.

On receipt of REQ=1 the peripheral unit rises again signal ACK to 1.

This causes, after 100 nsec. a new toggling of flip flop 3 and a new assertion of signal REQ.

The process continues indefinitely until flip flop 3 is forced into reset status by the control logic (gates 14, 15, 18 and flip flop 4) which will be considered later on.

The reset (set) status of flip flop 3 and the other flip flops of FIG. 1 is imposed by an electrical level 0 applied to the reset (set) input.

Register 1 may be implemented by cascade connecting five integrated circuits of the type 74F195.

It comprises 20 cells (C1,C2...C20) and is provided with a clock input CK and a control input PE for parallel loading.

The first cell has a serial input SI and a parallel input PI00. The remaining cells have a parallel input, PI01, PI02,...PI19 respectively.

Each cell has an output, SER00,SER01,...SER19 respectively.

If the signal input at PE is at electrical level 0, a transition from 0 to 1 at the clock input CK causes the parallel loading of register 1 with the information bits present at the parallel inputs.

If the signal input at PE is at level 1, a transition from 0 to 1 at the clock input causes the loading of the first cell with the level present at input SI and the shifting of the electrical state of each cell from one cell to the next one.

The clock input of register 1 is connected to the output of AND gate 17, receiving at one input the command DWC (normally at 1), generated by the controller.

AND gate 17 has a second input connected to the output of OR gate 12 and the third input connected to the output of NAND gate 20.

Flip Flop 2 has the direct output connected to an input of gates 12 and 20.

Gate 12 receives signal ACKN at a second input and gate 20 receives signal DREQ at the second input.

Flip flop 2, of JK type receives command DWC at the set input and signal ACK1 at the clock input.

The K input is connected to the output SEROO of register 1 and receives the signal SER00. The J input is connected to 0.

Flip flop 2 and gates 12,20,17 form a control logic for activation of the shift register 1, which receives command DWC at the PE input, DWC being normally at 1 and being suitably delayed through two inverters 29,30 cascade connected.

When at rest, flip flop 2 is reset and at the direct output a signal DWR at level 0 is present.

It can be immediately noted that at rest, signal DCLK in output from gate 17 is at level 0, because, with ACKN=0 and DWR=0, the output of gate 12 is at level 0.

Conversely, with DREQ=0, the output of NAND gate 20 is at level 1.

When command DWC is asserted, flip flop 2 is set an signal DWR raises to 1. Signal DCLK remains at 0, because DWC=0.

However, when DWC returns to 1, signal DCLK raises to 1 and, with delayed DWC still at level 1 at input PE, register 1 is parallel loaded.

In the following, after the start of the timing logic imposed by the next command DS3417, the raising of DREQ to 1 causes the drop of DCLK to 0 and the subsequent fall of DREQ to level 0 causes the raising again of DCLK to 1.

Therefore, as long as flip flop 2 is set, register 1 receives a clock pulse at the end of each assertion of signal REQ and, with DWC at level 1, on the occurrence of each clock, a one step shift occurs of the register 1 contents, the first cell being loaded with the level present at the serial input SI.

If flip flop 2 is reset (DWR=0) signal DCLK reflects the status of signal ACKN, hence a one step shift of register 1 contents occurs at each assertion of ACK and the first cell of register 1 is loaded with the signal level present at serial input SI.

Input SI of register 1 is connected to the output of multiplexer 22.

Muliplexer 22 has a first input connected to the output of receiver 8, through which the serial status information bits are received, and a second input connected to the output of NAND 26 to receive therefrom a signal NALLI (not all 1). Multiplexer 22 receives signal DWR (output from flip flop 2) at a control input. When DWR is at level 1, the second input is selected and when DWR is at level 0 the first input is selected.

The parallel inputs of register 1 are connected as follows:

Input PI00 is steadily connected to 1.

Inputs PIO1 and PI02 are steadily connected to 0.

Input PI03 is connected to the output of the parity bit generator 25, having inputs connected to channel IBUS.

Sixteen inputs from PI04 to PI19 are each connected to a corresponding lead of channel IBUS.

The outputs of register 1 are connected as follows:

Seventeen outputs from SEROO to SER 16 are each connected to an input of a driver set 27, whose outputs are connected to channel IBUS. The driver set 27 is enabled by a command RCFS at electrical level 0, otherwise is disabled. RCFS is generated by the controller unit.

The output SER19 is connected, through driver 11 to interface lead COMMAND.

The output SER00 is connected, as already indicated, to the K input of flip flop 2. It is further connected to an input of EX OR 21, which receives at a second input the signal PCK in output from parity generator 25. The output of gate 21 is connected to the JK inputs of flip flop 5 which receives command RCFS at the clock input and command DWC at the reset input. Signal SER17 at the output is input to OR gate 15 of the control logic.

The control logic has the function of resetting flip flop 3 and to stop the generation of transfer requests.

The control logic is activated by commands DWC and DS3417.

It comprises flip flops 2,4 and gates 14,15,18.

Flip flop 4, of JK type, has the JK inputs connected to lead IDB00 of channel IBUS and the direct output connected to an input of gate 14.

Command DS3417 is input to the clock input and an initialization reset command RST is input to the reset input.

On the occurrence of command DS3417, flip flop 4 is set and raises to 1 the level of lead IDB00, to indicate that the length of the requested transfer is 34 bits, 17 of which have to be transmitted and 17 have to be received.

If the transfer length is 17 bits only, to be transmitted, flip flop 4 is confirmed in reset status (level 0 of IDB00 lead).

Correspondingly a signal D34 at level 1 or 0 is input to an input of OR gate 14, which receives signal DWR at a second input.

The output of gate 14 is connected to a first input of AND gate 18, which receives at a second input the reset signal RST and has the third input connected to the output of OR gate 15.

OR gate 15 receives signals DCLK,SER17 and DWR at its inputs.

The operation of the control logic is as follows:

When the controller has to start a transfer operation, it sets flip flop 2 with command DWC (and with the same command register 1 is parallel loaded with the information present on channel IBUS and with the information present at inputs PI00,PI01,PI02,PI03).

Since SERO1 and SERO2 are 0 signal NALL is at electrical level 1.

With the setting of flip flop 2 signal DWR raises to 1.

This causes the removal of the forced reset condition imposed to flip flop 3 and the selection of signal NALL1 in input to multiplexer 22.

Immediately after, the controller starts the timing logic with command DS3417 and at the same time, it sets flip flop 4.

A transfer sequence starts, which involves the assertion of signal REQ for 17 times, and the reception of the related signal ACK.

Correspondingly register 1 receives 17 clock pulses, which cause the shifting of its contents towards the output SER19 and the consequent serial transfer of the information.

At the same time, since NALL1=1, the outputs from SER 00 to SER 16 raises to 1 in sequence.

With the 16th clock received by register 1 signal NALLI drops to 0.

With the 17th received clock, the first cell of register 1 is loaded with level 0 and signal SER00 drops to 0.

The next following 1-transition of signal ACK1, which closes the 17th transfer request (through which the parity bit, initially loaded in the fourth cell is transferred) causes the reset of flip flop 2.

DWR falls to 0 and if D34=0 flip flop 3 is forced in reset status and inhibits the generation of further requests.

On the contrary, if D34=1 flip flop 3 is not forced to reset (because D34=1 masks the fall to 0 of DWR in input to OR gate 14) and continues to toggle, thus generating new transfer requests.

It is however to be noted that for the following, with DWR=0, multiplexer 22 is controlled to transfer to SI input of register 1, the serial data present on lead CONF STATUS, and that the CLOCK signal which causes the loading and shifting of register 1 corresponds to signal ACKN, transferred through gate 12 (that is to the assertion of answer signal ACK from the peripheral unit).

It is further to be noted that beginning with the 17th transfer request, signal SER 17 is at 1 and remains 1 for all the subsequent transfer requests.

Therefore the fall of DWR to 0 in input to OR gate 15 does not have a reset action on flip flop 3.

It is only with the assertion of the 17th signal ACK subsequent to the reset of flip flop 2 (that is the 34th from the beginning of the transfer operation) that signal SER17 drops to 0, but its reset action on flip flop 3 is masked by signal DCLK as long as signal ACK is asserted.

Meanwhile, the receipt of ACK asserted causes the reset of flip flop 3 with a delay of 100 nsec, and upon removal of ACK, the fall of DCLK to 0 holds flip flop 3 forced in reset.

With the assertion of signal ACK for the 34th time, the status information transfer towards controller is completed and signal SER00 constitutes the parity bit of the received information.

Once the transfer is concluded, the peripheral unit may therefore assert signal CC, following which the controller may generate command RCFS=0, which by enabling the driver set 27 enables the transfer of register 1 contents (SER01 to SER16) on channel IBUS.

The information present on channel IBUS is received by parity generator 25 which regenerates a parity bit PCK. The parity bit is input to gate 21 and compared with the transmitted parity bit, available as signal SER00.

At the end of the command, if the two parity bits differs, flip flop 5 is set and produces an error indication.

The operation of the described circuit may be considered in a global way with reference to the timing diagrams of FIGS. 2 and FIG. 3 which show the electrical level of some of the described commands and signals.

In FIG. 2, the operation of the circuit is shown in the case that only command transfer is requested.

At a start time t0, the controller asserts command DWC and consequently DWR raises to 1 (flip flop 2 is set) together with signal RS in output from gate 18.

At a subsequent time TOPL, command DWC is removed and signal DCLK raises to 1.

Register 1 is parallel loaded.

At a subsequent time tl, the controller asserts command DS3417. Therefore signal DCLREQ falls to 0.

At a subsequent time T1R, command DS3417 is removed and DCLREQ rises again to 1 whilst DCLK falls to 0.

On receipt of ACK asserted ACKN rises to 1 and consequently DCLREQ falls to 0 for a duration of 100 nsec.

When DCLREQ rises again to 1 (time T1S) flip flop 3 toggles and DREQ falls to 0.

DCLK raises to 1 and effects a one step shift of register 1.

Both signal NALL1 and SER00 remain at level 1.

When signal REQ is removed, the peripheral unit removes signal ACK and ACKN falls again to 0 causing the fall to 0 of signal DCLREQ, for a duration of 100 nsec.

When DCLREQ rises again to 1 flip flop 3 toggles to its set state and DREQ rises to 1, whilst DCLK falls to 0.

A second transfer request begins.

The process continues in the same way by the generation of 16 subsequent transfer requests.

Once signal ACK related to the 16th transfer request is received, DCLREQ falls to 0 for 100 nsec.

When DCLREQ raises again to 1 DREQ falls to 0 and DCLK raises to 1 and effects a 16th shift operation of shift register 1 (time T16S).

By this operation the parity bit is shifted in the last cell of register 1 and is available at the output SER 19.

Cell 17 is loaded with a 1 bit and therefore all the outputs from SER00 to SER16 are at level 1.

Correspondingly signal NALL1 falls to 0.

At a subsequent time T17R a new transfer request is asserted and on the following receipt of signal ACK=0 a further shift operation is effected of register 1 (T17S).

Following such shift, the first cell of register 1 is set to 0 and SER00 falls to 0.

When signal ACK is removed (time TR) flip flop 2 is reset and DWR falls to 0.

Signal RS too falls to 0 and holds flip flop 3 in reset so that it does not toggle when the next raising edge of signal DCLREQ is received.

The transfer operation is therefore completed.

FIG. 3 shows a timing diagram of the transfer operation for command transmission and for status reception.

The initial phase does not differ from the one already described and therefore FIG. 3 shows the status of the several signals beginning from time T17S.

It further shows the status of signals D34 (output of flip flop 4), SER17,CC and RCFS. In particular SER17 is 1 starting from time T17S.

Since D34 is a 1, at time T18R a new transfer request is asserted even if DWR=0.

In addition, since DWR=0, multiplexer 22 is set to receive the first status information from lead CONF STATUS.

At time T18S, with the assertion of ACK which confirms the forwarding of the first status information bit from peripheral unit, signal DCLK raises to 1 and controls a load and shift operation of register 1.

The first bit is received and loaded in cell C1. It is available at output SER00.

SER17 is held at level 1.

The process continues with the generation of 16 further transfer requests referenced by times T19R to T34R and with the receipt of corresponding assertions of signal ACK.

On receipt of the last assertion of ACK (time T34S) a last shift operation of register 1 is controlled.

By this operation the level 0, previously loaded at time T17S (FIG.2) in the first register cell (C1) is shifted from cell C17 to cell C18 of register 1 and SER17 falls to 0.

Therefore at time TR2, when DCLK falls to 0, signal RS falls to 0 and holds flip flop 3 reset.

Subsequently the peripheral unit asserts signal CC (command completed) and, on receipt of such signal, the controller may assert command RCFS for transferring the information contained in cells from C2 to C17 on channel IBUS, through drivers 27.

FIG. 4 shows in tabular form the status of register 1 and of signal NALL1 at the output of gate 26 versus time.

A register output, from SER00 to SER19 corresponds to each row of the table.

The last row, referenced by NALL1 corresponds to the status of gate 26 output.

The time is defined by the instants TOPL of parallel loading of register 1, and T1S,...T34S of the subsequent shift command.

At the beginning (TOPL) register 1 is parallel loaded with the information to be transferred: an order number from 1 to 16 is assigned to each of the several bits.

These bits are available in cells from C5 to C20 and at the corresponding outputs from SER04 to SER19.

A parity bit CH is loaded in cell C4 and available at output SER03.

A 1 is loaded in the first cell and a 0 is loaded in the second and third cell.

The loading of such information is essential for the control of the circuit.

In fact, once the circuit has been preset by the start commands DS3417 and DWC, the operation proceeds under control of such control information, as a function of the position of such control information in the register, as a consequence of the shift operations.

With the shift commands from T1S to T16S the several bits of the information to be transferred, subsequent to the first bit, are made available at output SER 19 in serial mode.

At the same time, the control information 100 present at the outputs SER00, SER01, SER02, is shifted at the following outputs.

The initial presence of a 0 in the cell corresponding to output SERO1 assures, independently of the logical-/electrical level of the information bits to be transferred, that signal NALLI is held at 1 during a sequence of 15 shift commands.

Owing to such commands, the several register cells beginning with the first one are loaded with 1's With command T16S output SER16 too raises to 1 and NALL1 falls to 0.

With the 17th shift command T17S, output SER00 is forced to 0 and causes the stop of the transfer operation.

If owing to the initial preset of the control circuit, the receipt of status information is foreseen, signal SER00 at level 0 causes, with the reset of flip flop 2 (DWC=0) the start of the receipt operations and their stop when the logical level 0 present by time T17S at output SER00 results to have been traslated to output SER17 (time T34S).

It is clear that the described circuit constitutes a preferred form of embodiment of the invention and that several changes can be made.

In particular the shift register may have a number of cells equal to N+2 where N is the number of the bits composing the binary information to be transferred.

In this case the control information which is loaded in the first register cells of the register would consist of two bits only, for instance 1 and 0 or 0 and 1.

In other words the only requirement is that the control information contains two bits at a different logical-/electrical level, provided such level is known and independent on the information to be transferred.

Once this condition is met and in view of the preceding description it is obvious to provide the circuit changes required to detect the position of such control information during the several shift operations and to control the operation of the circuit so as to perform the required number of shift operations and the transmission/reception of binary codes in serial form.

What is claimed is:

1. Enhanced small device interface (ESDI) interface control circuit for serially transferring a first N bit binary code from a controller to a peripheral unit and for serially receiving a second N bit binary code from the peripheral unit to said controller, comprising:

a first flip flop (2) for latching a first transfer command (DWC), said first flip flop being set in a first state by said first command and outputting at an output thereof a binary signal representative of its state, a second flip flop (4), set in either a first or a second state by an activation command (DS3417), to indicate respectively that the transfer is only from controller to peripheral unit or from controller to peripheral unit followed by reception of said second binary code from peripheral unit to said controller, said second flip flop outputting at an output thereof as a binary signal representative of its state, a timing unit triggered a first time by said activation command and subsequent times on receipt of an interface acknowledge signal (ACK) for generating a transfer request signal (REQ), interlocked with said acknowledge signal, at a first output and a corresponding clock signal (DCLK) at a second output, a shift register having at least N+2 ordered cells, a serial input, a plurality of parallel inputs, one for each cells, a parallel loading control input, a clock input connected to said second output of said timing unit and a plurality of outputs, one for each cell said shift register being clocked by said clock signal to shift its content of one cell, said shift register being parallel loaded by said first command received at said parallel loading control input, the last N cells with said first binary code to be serially transferred, the first cell with a control bit at a first predetermined logic level and the second cell at least, with a separation bit having a logic level other than the one of said control bit, first logic means having inputs connected to the output of each of the first N-1 cells at least and an output providing an indication signal either at said first predetermined logic level or at a logic level inverted of said first predetermined one, to respectively indicate that said N-1 cells at least are not all or are all at said predetermined logic level, second logic means having a first input connected to said output of said first flip flop for receiving as input said signal representation of the state of said first flip flop, a second input connected to said output of said first logic means for receiving said indication signal and a third input for receiving a signal representative of the logic level of an interface lead for serially receiving said second binary code and having an output connected to said serial input of said shift register for inputting thereto said indication signal when said first flip flop is in said first state and said signal representative of the logic level of said interface lead, when said first flip flop is in state other than said first one, and third logic means having a first input connected to said output of said first flip flop for receiving as input said signal representative of the state of said first flip flop, a second input connected to said output of said second flip flop for receiving said signal representative of the state of said second flip flop, a third input connected to a predetermined output a said plurality of outputs for receiving a signal representative of the state of a predetermined one of said cells, for deactivating said timing unit, respectively after generation of N and 2N transfer request signals, as a function of the state of said second flip flop, said first flip flop being reset in a second state when said indication signal is at said predetermined logic level.

2. The control circuit as claimed in claim 1, wherein said register comprises N+2 cells and said predetermined cell is the Nth one.

3. The control circuit as claimed in claim 1 wherein said register comprises N+3 cells, the second and third cells being parallel loaded each with said separation bit, said first logic means being connected to the output of the first N cells and said predetermined cell being the N+1th one.

* * * * *